H. C. MILLIGAN.
GRIDDLE.
No. 191,703.
Patented June 5, 1877.
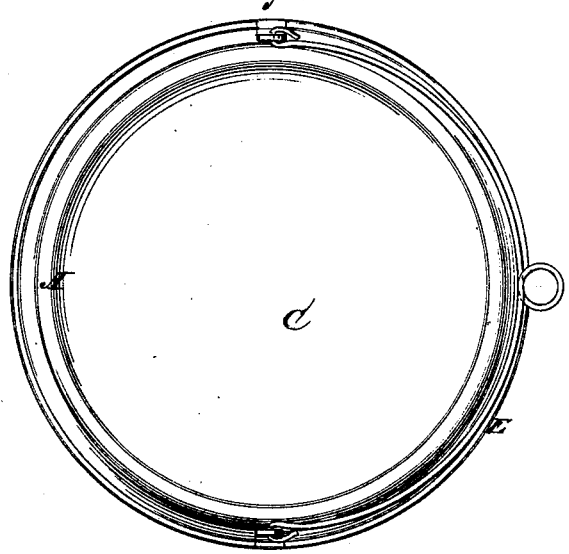
Witnesses:
Inventor:
Henry C. Milligan
By H. P. Thayer
atty

UNITED STATES PATENT OFFICE.

HENRY C. MILLIGAN, OF SOUTH ORANGE, NEW JERSEY, ASSIGNOR TO LALANCE AND GROSJEAN MANUFACTURING COMPANY.

IMPROVEMENT IN GRIDDLES.

Specification forming part of Letters Patent No. 191,703, dated June 5, 1877; application filed November 29, 1876.

*To all whom it may concern:*

Be it known that I, HENRY C. MILLIGAN, of South Orange, Essex county, and State of New Jersey, have invented new and useful Improvements in Griddles, of which the following is a specification:

The object of my invention is to contrive a sheet-metal griddle for cooking purposes, having all the advantages in form of the cast-metal griddles, and at the same time being of sheet metal, stamped or pressed into shape in the simplest and cheapest manner, whereby economy of labor and material may be secured, and a lighter and stronger article obtained.

Figure 1 is a transverse section of a griddle of my invention. Fig. 2 is a plan view.

In carrying out my invention I take a sheet of rolled iron, or other approved metal, in round, oval, elliptical, or other approved form, and stamp or press it in dies, such as are used for stamping or pressing sheet metal, and which are constructed in suitable form to make the raised rim A required on these articles, and are also formed to bend said rim downward, as at E, below the bottom C, for making the hot-air chamber D, which it is desirable to have in connection with these griddles, between the bottom thereof and the top of the stove. Thus the griddle may be produced in complete form, at one operation of the dies, in the stamping process, and may be made much thinner and lighter than it can be in cast metal, which is not only an economy of material, but it is advantageous in heating quickly, and is not liable to break in ordinary usage.

What I claim, and desire to secure by Letters Patent, is—

A stamped sheet-metal griddle in which the rim A is bent up from the bottom C, and has a turned-down flange, E, extending below the bottom and supporting it, substantially as described.

HENRY C. MILLIGAN.

Witnesses:
   WILLIAM LEE,
   WM. PORTER, Jr.